US011888522B2

(12) United States Patent
Shibahara et al.

(10) Patent No.: US 11,888,522 B2
(45) Date of Patent: Jan. 30, 2024

(54) OPTICAL TRANSMISSION SYSTEM AND OPTICAL TRANSMISSION METHOD

(71) Applicant: NIPPON TELEGRAPH AND TELEPHONE CORPORATION, Tokyo (JP)

(72) Inventors: Koki Shibahara, Musashino (JP); Takayuki Mizuno, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/800,201

(22) PCT Filed: Feb. 19, 2020

(86) PCT No.: PCT/JP2020/006489
§ 371 (c)(1),
(2) Date: Aug. 16, 2022

(87) PCT Pub. No.: WO2021/166112
PCT Pub. Date: Aug. 26, 2021

(65) Prior Publication Data
US 2023/0057448 A1 Feb. 23, 2023

(51) Int. Cl.
*H04B 10/2581* (2013.01)
*H04B 10/2507* (2013.01)
*H04B 10/61* (2013.01)

(52) U.S. Cl.
CPC ..... *H04B 10/2581* (2013.01); *H04B 10/2507* (2013.01); *H04B 10/614* (2013.01)

(58) Field of Classification Search
CPC ............ H04B 10/2581; H04B 10/2507; H04B 10/614; H04J 14/04
(Continued)

(56) References Cited

U.S. PATENT DOCUMENTS 6,525,853 B1 *  2/2003  Stuart ..................... H04J 14/02
                                                   398/115
10,425,162 B2 *  9/2019  Rekaya Ben-Othman ..................
                                                   H04B 10/2581
(Continued)

FOREIGN PATENT DOCUMENTS

DE    102009025232 A1 * 12/2010  ......... H04B 10/2581
DE    202017104616 U1 * 12/2017  ............. H04J 14/02
(Continued)

OTHER PUBLICATIONS

M. Filer and S. Tibuleac, N-degree ROADM Architecture Comparison: Broadcast-and-Select versus Route-and-Select in 120 Gb/s DP-QPSK Transmission Systems, OFC 2014, Mar. 9, 2014.
(Continued)

*Primary Examiner* — Abbas H Alagheband
(74) *Attorney, Agent, or Firm* — Harness, Dickey & Pierce, P.L.C.

(57) ABSTRACT

An optical transmission system including: N transmitters, each of the N transmitters being configured to convert one of N electrical signals indicating data sequences different from one another into an optical signal; a signal generator configured to cause N optical splitters to split the N optical signals output from the N transmitters to convert the N optical signals into M optical signals; a multiplexer configured to convert the M optical signals converted by the signal generator into one mode-multiplexed signal that is excitable in at least M modes; a demultiplexer configured to convert the mode-multiplexed signal converted by the multiplexer into M optical signals; M receivers, each of the M receivers being configured to convert one of the M optical signals converted by the demultiplexer into the electrical signal; and a signal detector configured to perform signal separation on
(Continued)

the M electrical signals converted by the M receivers to extract the N data sequences.

14 Claims, 6 Drawing Sheets

(58) Field of Classification Search
USPC .......................................................... 398/142
See application file for complete search history.

(56) References Cited

U.S. PATENT DOCUMENTS

| | | | | |
|---|---|---|---|---|
| 11,206,095 | B1* | 12/2021 | Wang | H04W 56/001 |
| 2012/0207470 | A1* | 8/2012 | Djordjevic | H04J 14/06 |
| | | | | 398/44 |
| 2014/0286648 | A1* | 9/2014 | Buelow | G02B 6/2808 |
| | | | | 398/143 |
| 2015/0085884 | A1* | 3/2015 | Fontaine | H04B 10/2581 |
| | | | | 370/542 |
| 2017/0373787 | A1* | 12/2017 | Moon | H04J 14/04 |
| 2023/0057448 | A1* | 2/2023 | Shibahara | H04B 10/614 |

FOREIGN PATENT DOCUMENTS

| | | | | | |
|---|---|---|---|---|---|
| EP | 2365654 | A2 | * | 9/2011 | ......... G02B 6/02042 |
| EP | 2725729 | A1 | * | 4/2014 | ......... H04B 10/2581 |
| KR | 20140131975 | A | * | 11/2014 | |
| WO | WO-2011052405 | A1 | * | 5/2011 | ............... G02B 5/32 |
| WO | WO-2017150481 | A1 | * | 9/2017 | ............... G02B 6/02 |

OTHER PUBLICATIONS

Brandon Collings, New Devices Enabling Software-Defined Optical Networks, IEEE Communications Magazine, Mar. 2013, pp. 66-71.

* cited by examiner

OPTICAL TRANSMISSION SYSTEM AND OPTICAL TRANSMISSION METHOD

CROSS-REFERENCE TO RELATED APPLICATIONS

This application is a 371 U.S. National Phase of International Application No. PCT/JP2020/006489, filed on Feb. 19, 2020. The entire disclosure of the above application is incorporated herein by reference.

TECHNICAL FIELD

The present invention relates to an optical transmission system and an optical transmission method.

BACKGROUND ART

With the prevalence of smartphones in recent years, development of high definition video service distribution and Internet of things (IoT) services, and the like, communication traffics flowing through optical networks have been on the rise yearly. In optical networks, increasing communication traffic demands have been dealt with by, for example, increasing functionality of optical communication system apparatuses installed in terminal stations of optical networks and introducing optical amplifiers and optical switches without changing a structure of an optical fiber as a transmission line.

A single-mode fiber is used as an optical fiber underlying the current large-capacity optical networks except for a local network for near-field purposes such as a local area network (LAN). The single-mode fiber is a fiber having, in a clad, a single core that is a path for an optical signal, and supports only a single mode for a wavelength band such as C-band or L-band used in the large-capacity optical networks. Such a single-mode fiber enables a large-capacity optical network that stably transfers information of several terabits per second over a long distance.

Furthermore, a digital coherent transmission technique in which a digital signal processing technique and a coherent transmission/reception technique are combined has already been introduced to a 100 gigabit-grade optical transmission apparatus. When the digital coherent transmission technique is used, it is possible to retrieve information placed independently on an amplitude and a phase of an optical carrier and correct a waveform distortion caused during transmission with high accuracy.

Simple examples include polarization multiplexed optical transmission using two modes of orthogonal polarizations in a single-mode fiber. In the polarization multiplexed optical transmission, a different piece of information can be placed on each of orthogonal polarizations. These polarizations are complexly mixed in an optical transmission line. In addition, the orthogonal axes of these polarization modes vary at a high speed, and thus it is generally difficult to track the orthogonal axes using an optical device. A reception apparatus compatible with a polarization diversity structure receives a polarization multiplexed optical signal obtained by mixing the polarizations, converts it into a digital signal, and uses digital signal processing to separate the signal. The above processing can be modeled as a 2×2 multiple-input multiple-output (MIMO) system used in a wireless communication system. From the signals obtained by the separation, information is retrieved for each of the polarizations, and communication is established between a transmitter and a receiver.

Another example is a mode-multiplexed optical transmission using a plurality of modes in a multi-mode fiber. In the mode-multiplexed optical transmission, by increasing a core diameter in comparison to that of the single-mode fiber, it is possible to excite a plurality of modes also in a wavelength band such as C-band, and to place a different piece of information on each of the modes. As in the case of the polarization multiplexed optical transmission described above, in the case of the mode-multiplexed optical transmission as well, mode signals are complexly mixed in the mode-multiplexed optical signal which is propagating through the multi-mode fiber. A reception apparatus compatible with the mode diversity structure receives the mode-multiplexed signal obtained by mixing the mode signals, converts it into a digital signal, and uses digital signal processing to separate the signal.

For example, in a few-mode fiber for 2 LP modes in which two linear polarization (LP) modes are excited, an LP01 mode serving as a fundamental mode and an LP11 mode serving as a high-order mode are excited. Further, when two degenerate modes in the LP11 mode (LP11*a* and LP11*b*) and polarization modes of each of the modes (X polarization and Y polarization) are utilized, it is possible to place a different piece of information on each of total 6 spatial modes of LP01X, LP01Y, LP11*a*X, LP11*a*Y, LP11*b*X, LP11*b*Y in the few-mode fiber for 2 LP modes. As a result, as compared to a case in which two modes of orthogonal polarizations are used in the existing single-mode fiber, the few-mode fiber for 2 LP modes can achieve a transmission capacity that is three times.

CITATION LIST

Non Patent Literature

NPL 1: M. Filer and S. Tibuleac, "N-degree ROADM Architecture Comparison: Broadcast-and-Select versus Route-and-Select in 120 Gb/s DP-QPSK Transmission Systems", Th1I.2, OFC 2014.

NPL 2: Brandon Collings, "New Devices Enabling Software-Defined Optical Networks", NEW PARADIGMS IN OPTICAL COMMUNICATIONS AND NETWORKS, IEEE Communications Magazine, pp. 66-71, March 2013.

SUMMARY OF THE INVENTION

Technical Problem

However, in a mode-multiplexed optical transmission in which a multi-mode fiber or a few-mode fiber is used as a transmission medium to place an independent signal on each spatial mode, there is a problem in that a transmission characteristic deviation for each spatial channel is large. This is because, for a power loss associated with fiber propagation, a power loss at a fiber connecting portion, and a gain in a mode multiplexing optical amplifier, a high-order spatial mode is generally more likely to be deteriorated than a fundamental spatial mode. The above phenomenon can be comprehensively evaluated as an effect of a mode-dependent loss. When the transmission characteristics in a specific spatial channel are poor, there has been a problem in that a transmission capacity and a transmission distance are difficult to enjoy the benefit as a mode multiplexing system because the spatial channel rate-controls the entire system.

The present invention has been made in view of the above circumstances, and an object of the present invention is to provide an optical transmission system and an optical transmission method that are capable of reducing information errors in optical signals that are transmitted through a transmission line by mode multiplexing.

Means for Solving the Problem

An aspect of the present invention is an optical transmission system including: N transmitters, each of the N transmitters being configured to convert one of N electrical signals indicating data sequences different from one another into an optical signal; a signal generator configured to cause N optical splitters to split the N optical signals output from the N transmitters to convert the N optical signals into M optical signals; a multiplexer configured to convert the M optical signals converted by the signal generator into one mode-multiplexed signal that is excitable in at least M modes; a demultiplexer configured to convert the mode-multiplexed signal converted by the multiplexer into M optical signals; M receivers, each of the M receivers being configured to convert one of the M optical signals converted by the demultiplexer into the electrical signal; and a signal detector configured to perform signal separation on the M electrical signals converted by the M receivers to extract the N data sequences.

Another aspect of the present invention is an optical transmission system including: N transmitters, each of the N transmitters being configured to convert one of N electrical signals indicating data sequences different from one another into an optical signal; an optical switch configured to branch the N optical signals output from the N transmitters into M optical signals; a multiplexer configured to convert the M optical signals output from the optical switch into one mode-multiplexed signal that is excitable in at least M modes; a demultiplexer configured to convert the mode-multiplexed signal converted by the multiplexer into M optical signals; M receivers, each of the M receivers being configured to convert one of the M optical signals converted by the demultiplexer into the electrical signal; and a signal detector configured to perform signal separation on the M electrical signals converted by the M receivers to extract the N data sequences.

Furthermore, an aspect of the present invention is an optical transmission system including: M transmitters, each of the M transmitters being configured to convert one of M electrical signals generated by replicating N electrical signals indicating data sequences different from one another into an optical signal; a multiplexer configured to convert the M optical signals output from the M transmitters into one mode-multiplexed signal that is excitable in at least M modes; a demultiplexer configured to convert the mode-multiplexed signal converted by the multiplexer into M optical signals; M receivers, each of the M receivers being configured to convert one of the M optical signals converted by the demultiplexer into the electrical signal; and a signal detector configured to perform signal separation on the M electrical signals converted by the M receivers to extract the N data sequences.

Furthermore, an aspect of the present invention is an optical transmission method including: a transmission step of converting, by N transmitters, N electrical signals indicating data sequences different from one another into optical signals; a signal generation step of splitting, by N optical splitters, the N optical signals output from the N transmitters to covert the N optical signals into M optical signals; a multiplexing step of converting the M optical signals converted in the signal generation step into one mode-multiplexed signal that is excitable in at least M modes; a demultiplexing step of converting the mode-multiplexed signal converted in the multiplexing step into M optical signals; a reception step of converting, by M receivers, the M optical signals converted in the demultiplexing step into the electrical signals; and a signal detection step of performing signal separation on the M electrical signals converted by the M receivers to extract the N data sequences.

Furthermore, an aspect of the present invention is an optical transmission method including: a transmission step of converting, by N transmitters, N electrical signals indicating data sequences different from one another into optical signals; a branching step of branching, by an optical switch, the N optical signals output from the N transmitters into M optical signals; a multiplexing step of converting the M optical signals output from the optical switch into one mode-multiplexed signal that is excitable in at least M modes; a demultiplexing step of converting the mode-multiplexed signal converted in the multiplexing step into M optical signals; a reception step of converting, by M receivers, the M optical signals converted in the demultiplexing step into the electrical signals; and a signal detection step of performing signal separation on the M electrical signals converted by the M receivers to extract the N data sequences.

Furthermore, an aspect of the present invention is an optical transmission system including: a transmission step of converting, by M transmitters, M electrical signals generated by replicating N electrical signals indicating data sequences different from one another into optical signals; a multiplexing step of converting the M optical signals output from the M transmitters into one mode-multiplexed signal that is excitable in at least M modes; a demultiplexing step of converting the mode-multiplexed signal converted in the multiplexing step into M optical signals; a reception step of converting, by M receivers, the M optical signals converted in the demultiplexing step into the electrical signals; and a signal detection step of performing signal separation on the M electrical signals converted by the M receivers to extract the N data sequences.

Effects of the Invention

According to the present invention, it is possible to reduce information errors in optical signals transmitted through a transmission line by mode multiplexing.

DESCRIPTION OF EMBODIMENTS

First Embodiment

Figure 1:
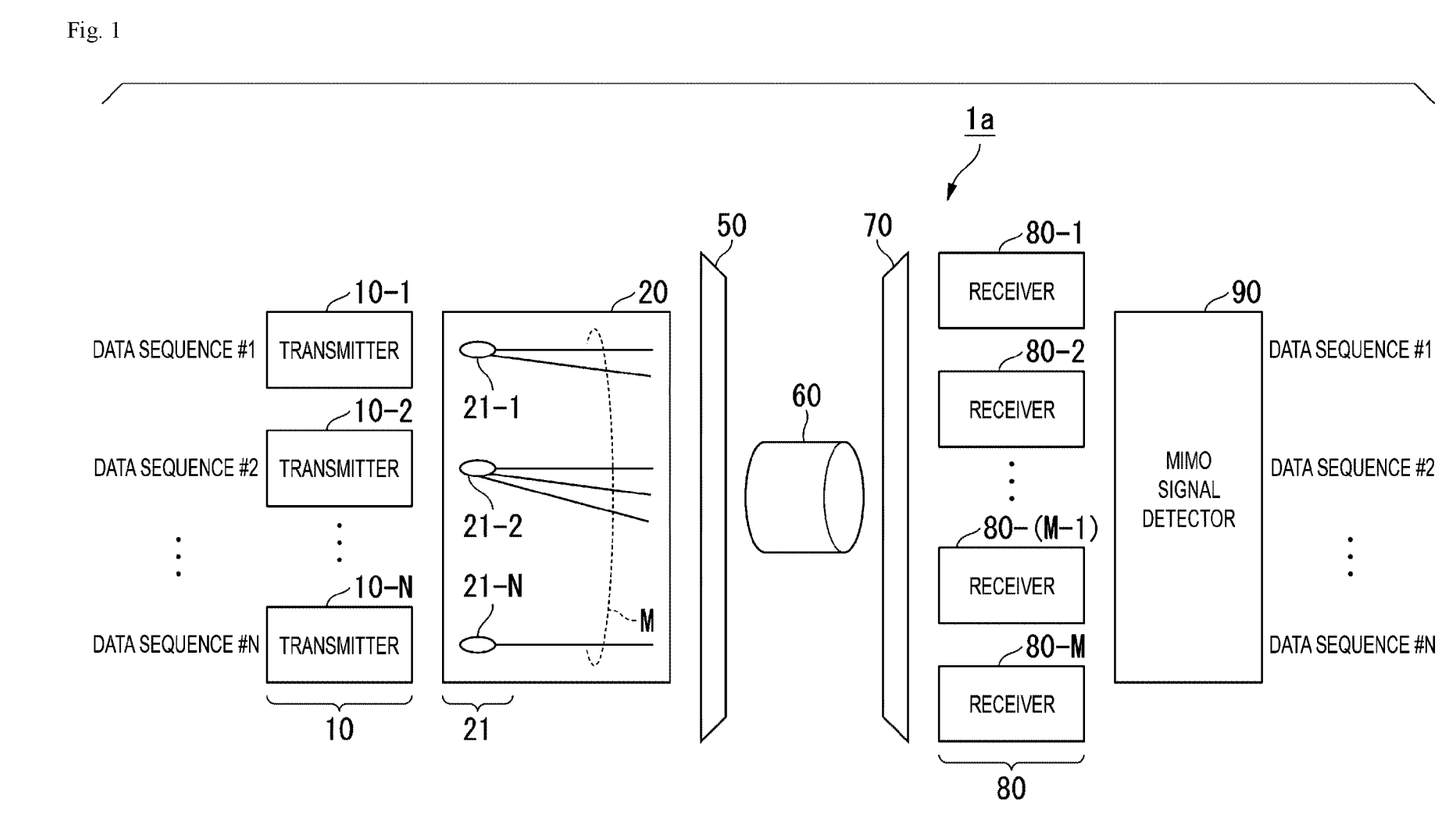
FIG. 1 is a configuration diagram of a multi-mode optical fiber system 1a according to a first embodiment of the present invention.

Hereinafter, a multi-mode optical fiber system 1a according to a first embodiment of the present invention will be described with reference to drawings.

Configuration of Multi-Mode Optical Fiber System FIG. 1 is a configuration diagram of the multi-mode optical fiber system 1a according to the first embodiment of the present invention. As illustrated, the multi-mode optical fiber system 1a includes transmitters 10, a diversity signal generator 20, a mode multiplexer/demultiplexer 50, a mode-multiplexed fiber 60, a mode multiplexer/demultiplexer 70, receivers 80, and a MIMO signal detector 90.

The multi-mode optical fiber system 1a includes N (where N is an integer of 1 or more) transmitters 10 (transmitter 10-1 to transmitter 10-N). The multi-mode optical fiber system 1a also includes M (where M is an integer of one or more, and N<M) receivers 80 (receiver 80-1 to receiver 80-M).

The multi-mode optical fiber system 1a acquires N independent information sequences (hereinafter referred to as "data sequences") output from, for example, an external device or the like, respectively, by the N transmitters 10. The multi-mode optical fiber system 1a is an optical transmission system for transmitting N data sequences (data sequence #1 to data sequence #N) with no error from the transmitter 10 side to the receiver 80 side.

The transmitter 10-1 to the transmitter 10-N appropriately encode the data sequence #1 to the data sequence #N, respectively. The transmitter 10-1 to the transmitter 10-N convert the encoded data sequence #1 to the encoded data sequence #N, respectively, from electrical signals to optical signals. The transmitter 10-1 to the transmitter 10-N output the data sequence #1 to the data sequence #N converted to the optical signals, respectively, to the diversity signal generator 20.

The diversity signal generator 20 (signal generator) includes N optical splitters 21 (optical splitter 21-1 to optical splitter 21-N).

The optical splitter 21-1 to the optical splitter 21-N acquire the optical signals output from the transmitter 10-1 to the transmitter 10-N, respectively. Each of the optical splitters 21 splits input light with a uniform power into p optical signals (where p is an integer of 1 or more and M or less). In this way, N optical signals are split into M optical signals by the N optical splitters 21.

The diversity signal generator 20 outputs the M optical signals to the mode multiplexer/demultiplexer 50. Note that the diversity signal generator 20 may include, for example, an optical amplifier and an optical attenuator as necessary. In this case, a power loss caused by light branching by the optical splitters 21 is adjusted (compensated).

The mode multiplexer/demultiplexer 50 (multiplexer) acquires the M optical signals output from the diversity signal generator 20. The mode multiplexer/demultiplexer 50 converts the acquired M optical signals into one mode-multiplexed signal by multiplexing the acquired M optical signals in different types of spatial modes. The mode multiplexer/demultiplexer 50 causes the mode-multiplexed signal to be incident on the mode-multiplexed fiber 60.

The mode-multiplexed fiber 60 serving as a transmission line is, for example, an optical fiber having a single core. The mode-multiplexed fiber 60 is an optical fiber in which at least M modes are excitable in a wavelength band to be used.

The mode-multiplexed fiber 60 is, for example, a multi-mode fiber or a few-mode fiber.

The mode-multiplexed fiber 60 transmits the mode-multiplexed signal incident from the mode multiplexer/demultiplexer 50 and causes the mode-multiplexed signal to exit to the mode multiplexer/demultiplexer 70.

The mode multiplexer/demultiplexer 70 (demultiplexer) converts the acquired mode-multiplexed signal into M optical signals. The mode multiplexer/demultiplexer 70 outputs the M optical signals to the M receivers 80, respectively.

The receivers 80 each are a reception device compatible with the mode diversity structure. The receivers 80 compatible with the mode diversity structure can receive the mode-multiplexed signal that is complexly mixed by propagating through the mode-multiplexed fiber 60 and convert the mode-multiplexed signal into a digital signal (electrical signal).

Each of the M receivers 80 converts the optical signal acquired from the mode multiplexer/demultiplexer 70 into an electrical signal. Each of the M receivers 80 outputs the electrical signal to the MIMO signal detector 90. As a result, each of the M electrical signals is output to the MIMO signal detector 90.

The MIMO signal detector 90 acquires the electrical signals output from the M receivers 80. The MIMO signal detector 90 removes distortion and the like contained in the acquired M electrical signals. As a result, the MIMO signal detector 90 can separate the M electrical signals by digital signal processing and extract the original N data sequences (data sequence #1 to data sequence #N). The MIMO signal detector 90 outputs the extracted N data sequences to, for example, an external device or the like.

Note that examples of an algorithm that can be used in the signal separation described above by the MIMO signal detector 90 include spatial filtering, interference canceler, and maximum-likelihood decoding.

Note that in the present embodiment, signals constituting the mode-multiplexed signal are labeled by numbers from 1 to M, but these include so-called a polarization mode and a degenerate mode. For example, in a few-mode fiber for 2 LP modes in which two linear polarization (LP) modes are excited, an LP01 mode serving as a fundamental mode and an LP11 mode serving as a high-order mode are excited. Furthermore, when degenerate modes in LP11 mode (LP11a and LP11b) and polarization modes in each of the modes (X polarization and Y polarization) are utilized, it is possible to place a different piece of information on each of total 6 spatial modes of LP01X, LP01Y, LP11aX, LP11aY, LP11bX, LP11bY in the few-mode fiber for 2 LP modes. The mode described herein means that each of the modes is dealt with in a discriminated manner.

Note that in the present embodiment, for ease of explanation, each of the transmitters 10 is configured to output a signal having a single wavelength, but the present invention is not limited to this configuration. In other words, even when a transmitter that outputs signals having a plurality of wavelengths is used, the effect of the present embodiment does not change.

Figure 2:
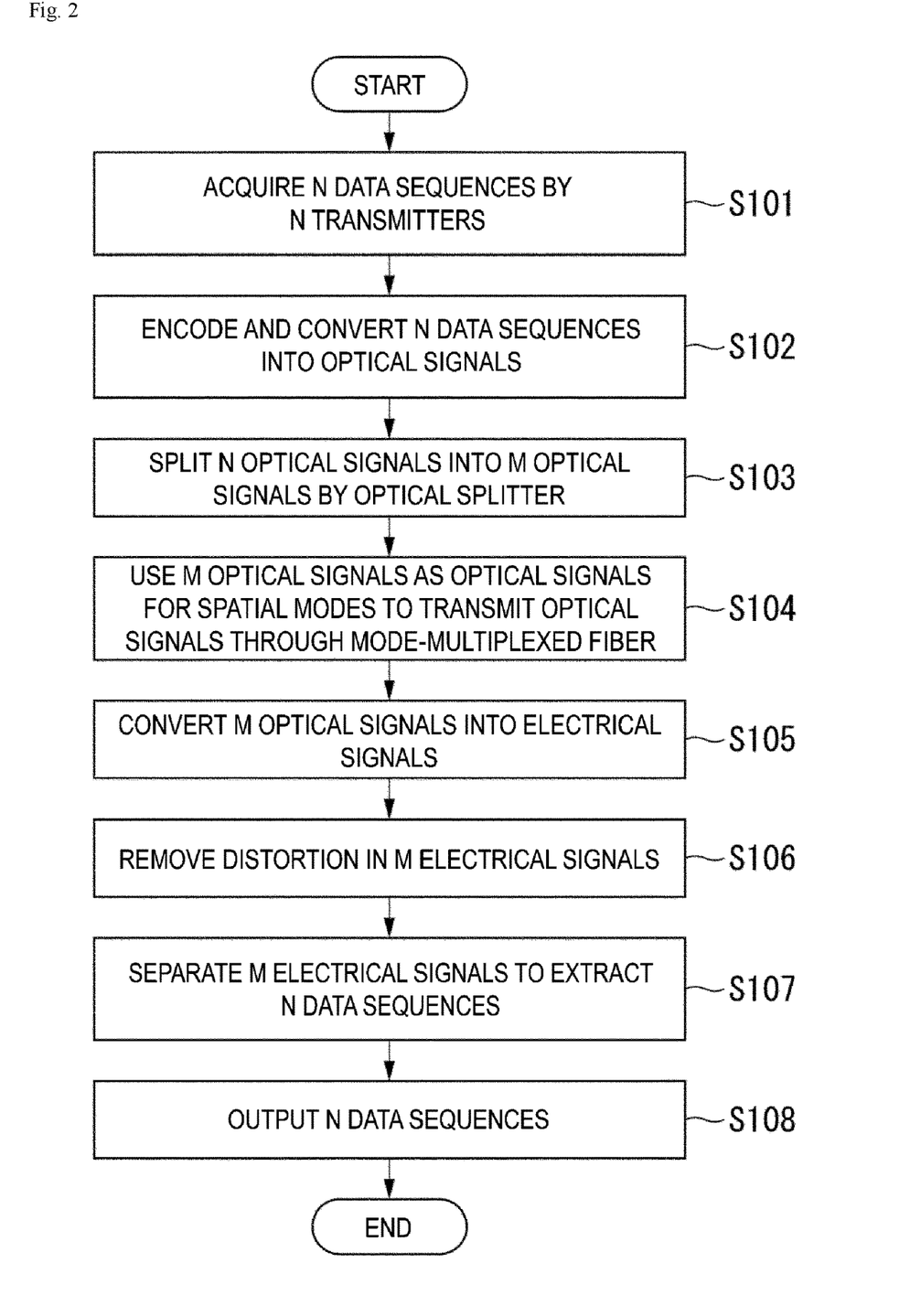
FIG. 2 is a flowchart illustrating an operation of the multi-mode optical fiber system 1a according to the first embodiment of the present invention.

Operation of Multi-Mode Optical Fiber System In the following, an example of an operation of the multi-mode optical fiber system 1a will be described.

FIG. 2 is a flowchart illustrating the operation of the multi-mode optical fiber system 1a according to the first embodiment of the present invention.

The multi-mode optical fiber system 1a acquires N data sequences (data sequence #1 to data sequence #N) output from, for example, an external device or the like by the N transmitters 10 (transmitter 10-1 to transmitter 10-N), respectively (step S101).

Each of the N transmitters 10 (transmitter 10-1 to transmitter 10-N) encodes a corresponding one of the N data sequences (data sequence #1 to data sequence #N), and converts the data sequence from an electrical signal to an optical signal (step S102).

The N optical splitters 21 (optical splitter 21-1 to optical splitter 21-N) of the diversity signal generator 20 split the N optical signals into M (M>N) optical signals (step S103). The diversity signal generator 20 outputs the M optical signals to the mode multiplexer/demultiplexer 50.

The mode multiplexer/demultiplexer 50 converts the acquired M optical signals into one mode-multiplexed signal by using the M optical signals as different types of modes. The mode multiplexer/demultiplexer 50 causes the mode-multiplexed signal to be incident on the mode-multiplexed fiber 60.

The mode-multiplexed fiber 60 transmits the mode-multiplexed signal incident from the mode multiplexer/demultiplexer 50 and causes the mode-multiplexed signal to exit to the mode multiplexer/demultiplexer 70. The mode multiplexer/demultiplexer 70 converts the acquired mode-multiplexed signal into M optical signals and outputs these M optical signals to the M receivers 80, respectively (step S104).

Each of the M receivers 80 (receiver 80-1 to receiver 80-M) converts a corresponding one of the acquired optical signals into an electrical signal (step S105).

The MIMO signal detector 90 removes distortion and the like contained in the M electrical signals (step S106). Then, the MIMO signal detector 90 separates the M electrical signals to extract the original N data sequences (data sequence #1 to data sequence #N) (step S107).

The MIMO signal detector 90 outputs the N data sequences to, for example, an external device or the like (step S108).

Heretofore, the operation of the multi-mode optical fiber system 1a illustrated in the flowchart of FIG. 2 ends.

In this way, the multi-mode optical fiber system 1a according to the first embodiment of the present invention has a transmit diversity configuration. As a result, the multi-mode optical fiber system 1a can effectively increase a signal to noise ratio (SNR) for an optical signal on which a single data sequence is placed. In particular, when the diversity configuration is applied to a spatial channel exhibiting poor characteristics, the effect of improving transmission characteristics is expected as compared to the related art.

From the foregoing, the multi-mode optical fiber system 1a according to the first embodiment of the present invention can reduce information errors of optical signals transmitted through a transmission line by mode multiplexing.

Second Embodiment

Figure 3:
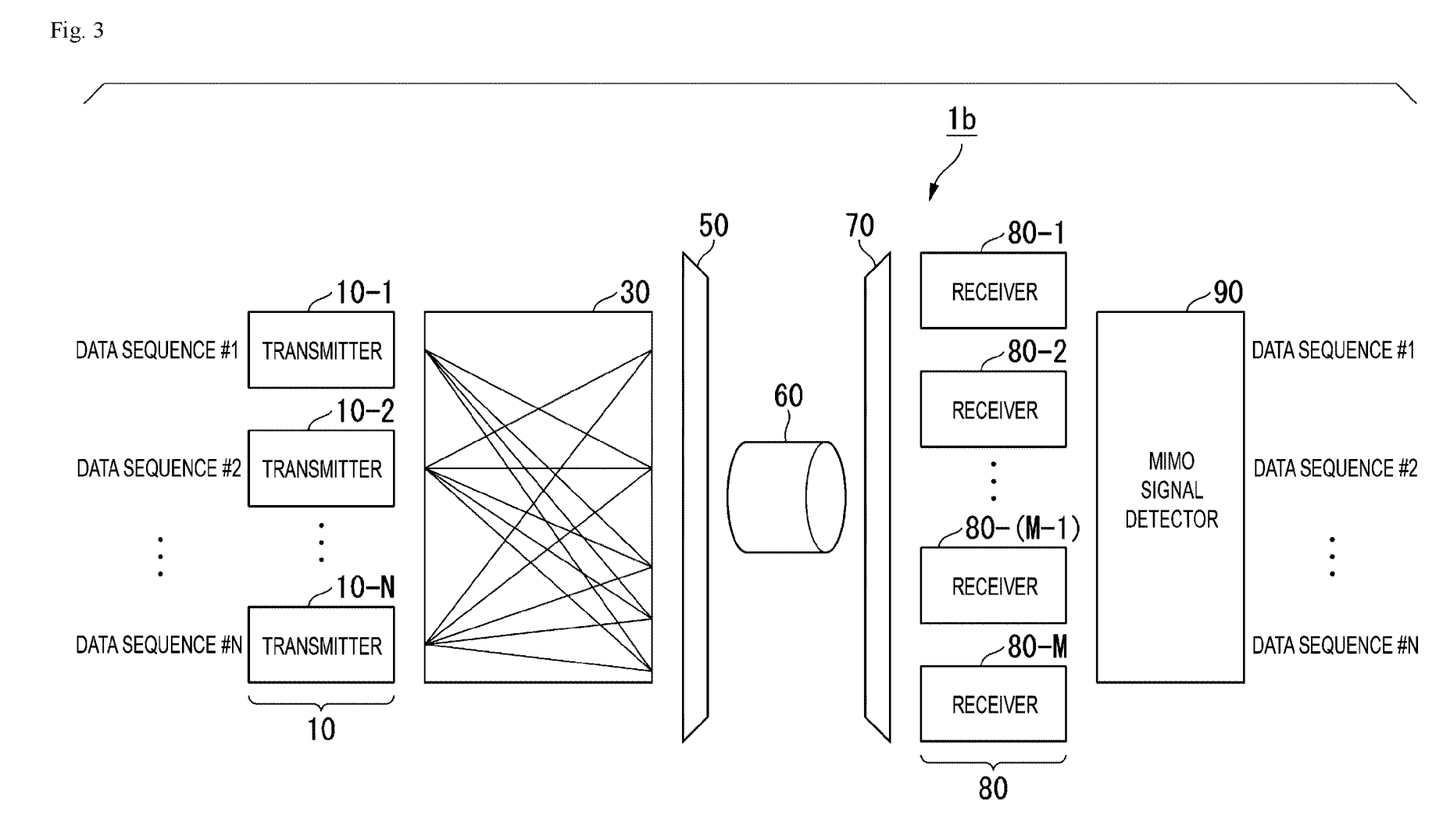
FIG. 3 is a configuration diagram of a multi-mode optical fiber system 1b according to a second embodiment of the present invention.

Hereinafter, a multi-mode optical fiber system 1b according to a second embodiment of the present invention will be described with reference to the drawings.

Configuration of Multi-Mode Optical Fiber System

FIG. 3 is a configuration diagram of the multi-mode optical fiber system 1b according to the second embodiment of the present invention. As illustrated, the multi-mode optical fiber system 1b includes transmitters 10, an optical switch 30, a mode multiplexer/demultiplexer 50, a mode-multiplexed fiber 60, a mode multiplexer/demultiplexer 70, receivers 80, and a MIMO signal detector 90.

The multi-mode optical fiber system 1b includes N (where N is an integer of 1 or more) transmitters 10 (transmitter 10-1 to transmitter 10-N). The multi-mode optical fiber system 1b also includes M (where M is an integer of 1 or more and N<M) receivers 80 (receiver 80-1 to receiver 80-M).

The multi-mode optical fiber system 1b acquires N data sequences output from, for example, an external device by the N transmitters 10, respectively. The multi-mode optical fiber system 1b is an optical transmission system for transmitting the N data sequences (data sequence #1 to data sequence #N) with no error from the transmitter 10 side to the receiver 80 side.

The transmitter 10-1 to the transmitter 10-N appropriately encode the data sequence #1 to the data sequence #N, respectively. The transmitter 10-1 to the transmitter 10-N convert the encoded data sequence #1 to the encoded data sequence #N, respectively, from electrical signals to optical signals. The transmitter 10-1 to the transmitter 10-N output the data sequence #1 to the data sequence #N converted to the optical signals, respectively to the optical switch 30.

The optical switch 30 acquires the optical signals output from the transmitter 10-1 to the transmitter 10-N. The optical switch 30 branches the acquired N optical signals into M optical signals. The optical switch 30 outputs any M optical signals to the mode multiplexer/demultiplexer 50.

Note that the optical switch 30 is constituted by, for example, a broadcast & select (B&S) switch or a route & select (R&S) switch. For example, when the optical switch 30 is constituted by the B&S switch, the optical switch 30 can be achieved by combining an optical splitter (input side), a wavelength selection switch (output side), an optical amplifier, an optical attenuator, and the like. Alternatively, for example, when the optical switch 30 is constituted by the R&S switch, the optical switch 30 can be achieved by combining a 1xN wavelength selection switch (input side), an Mx1 wavelength selection switch (output side), an optical amplifier, an optical attenuator, and the like.

The mode multiplexer/demultiplexer 50 (multiplexer) acquires the M optical signals output from the diversity signal generator 20. The mode multiplexer/demultiplexer 50 converts the acquired M optical signals into one mode-multiplexed signal by multiplexing the acquired M optical signals in different types of spatial modes. The mode multiplexer/demultiplexer 50 causes the mode-multiplexed signal to be incident on the mode-multiplexed fiber 60.

The mode-multiplexed fiber 60 serving as a transmission line is, for example, an optical fiber having a single core. The mode-multiplexed fiber 60 is an optical fiber in which at least M modes are excitable in a wavelength band to be used. The mode-multiplexed fiber 60 is, for example, a multi-mode fiber or a few-mode fiber.

The mode-multiplexed fiber 60 transmits the mode-multiplexed signal incident from the mode multiplexer/demultiplexer 50 and causes the mode-multiplexed signal to exit to the mode multiplexer/demultiplexer 70.

The mode multiplexer/demultiplexer 70 (demultiplexer) converts the acquired mode-multiplexed signal into M optical signals. The mode multiplexer/demultiplexer 70 outputs the M optical signals to the M receivers 80, respectively.

The receivers 80 each are a reception device compatible with the mode diversity structure. Each of the M receivers 80 converts the optical signal acquired from the mode multiplexer/demultiplexer 70 into an electrical signal. Each of the M receivers 80 outputs the electrical signal to the MIMO signal detector 90. As a result, each of the M electrical signals is output to the MIMO signal detector 90.

The MIMO signal detector 90 acquires the electrical signals output from the M receivers 80. The MIMO signal detector 90 removes distortion and the like contained in the acquired M electrical signals. As a result, the MIMO signal detector 90 can separate the M electrical signals by digital signal processing to extract the original N data sequences (data sequence #1 to data sequence #N). The MIMO signal detector 90 outputs the extracted N data sequences to, for example, an external device or the like.

Figure 4:
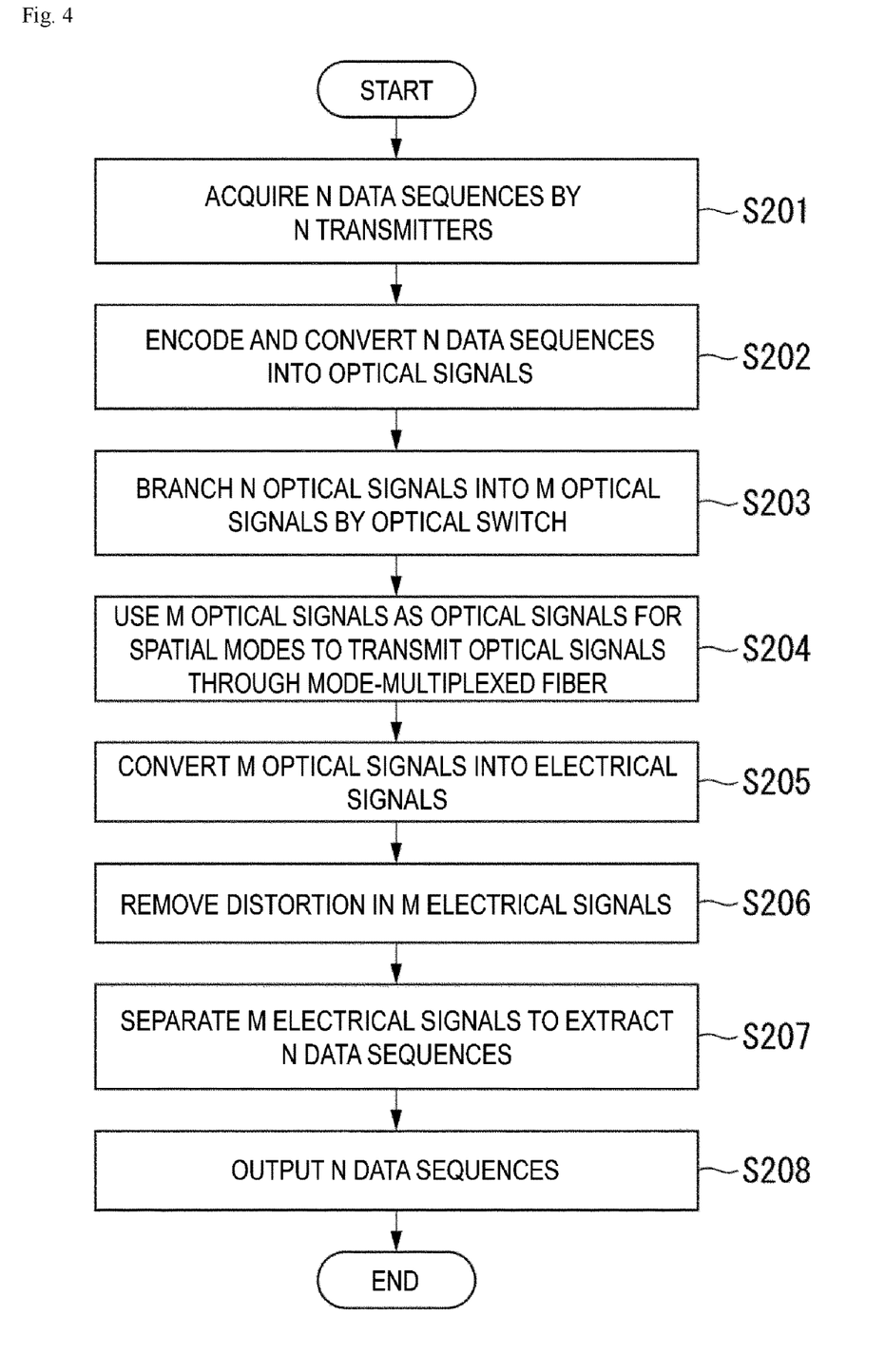
FIG. 4 is a flowchart illustrating an operation of the multi-mode optical fiber system 1b according to the second embodiment of the present invention.

Operation of Multi-Mode Optical Fiber System In the following, an example of an operation of the multi-mode optical fiber system 1b will be described.

FIG. 4 is a flowchart illustrating an operation of the multi-mode optical fiber system 1b according to the second embodiment of the present invention.

The multi-mode optical fiber system 1b acquires N data sequences (data sequence #1 to data sequence #N) output from, for example, an external device or the like by the N transmitters 10 (transmitter 10-1 to transmitter 10-N), respectively (step S201).

Each of the N transmitters 10 (transmitter 10-1 to transmitter 10-N) encodes a corresponding one of the N data sequences (data sequence #1 to data sequence #N), and converts the data sequence from an electrical signal to an optical signal (step S202).

The optical switch 30 branches the N optical signals into M optical signals. (Step S203). The optical switch 30 outputs the M optical signals to the mode multiplexer/demultiplexer 50.

Note that the operation of the multi-mode optical fiber system 1b in and after step S204 is similar to the operation of the multi-mode optical fiber system 1a illustrated in and after step S104 of FIG. 2 described above, and thus description thereof is omitted.

In this way, the multi-mode optical fiber system 1b according to the second embodiment of the present invention can use any data sequences and any spatial channels to perform transmission diversity.

From the foregoing, the multi-mode optical fiber system 1b according to the second embodiment of the present invention can reduce information errors of optical signals transmitted through a transmission line by mode multiplexing.

Third Embodiment

Figure 5:
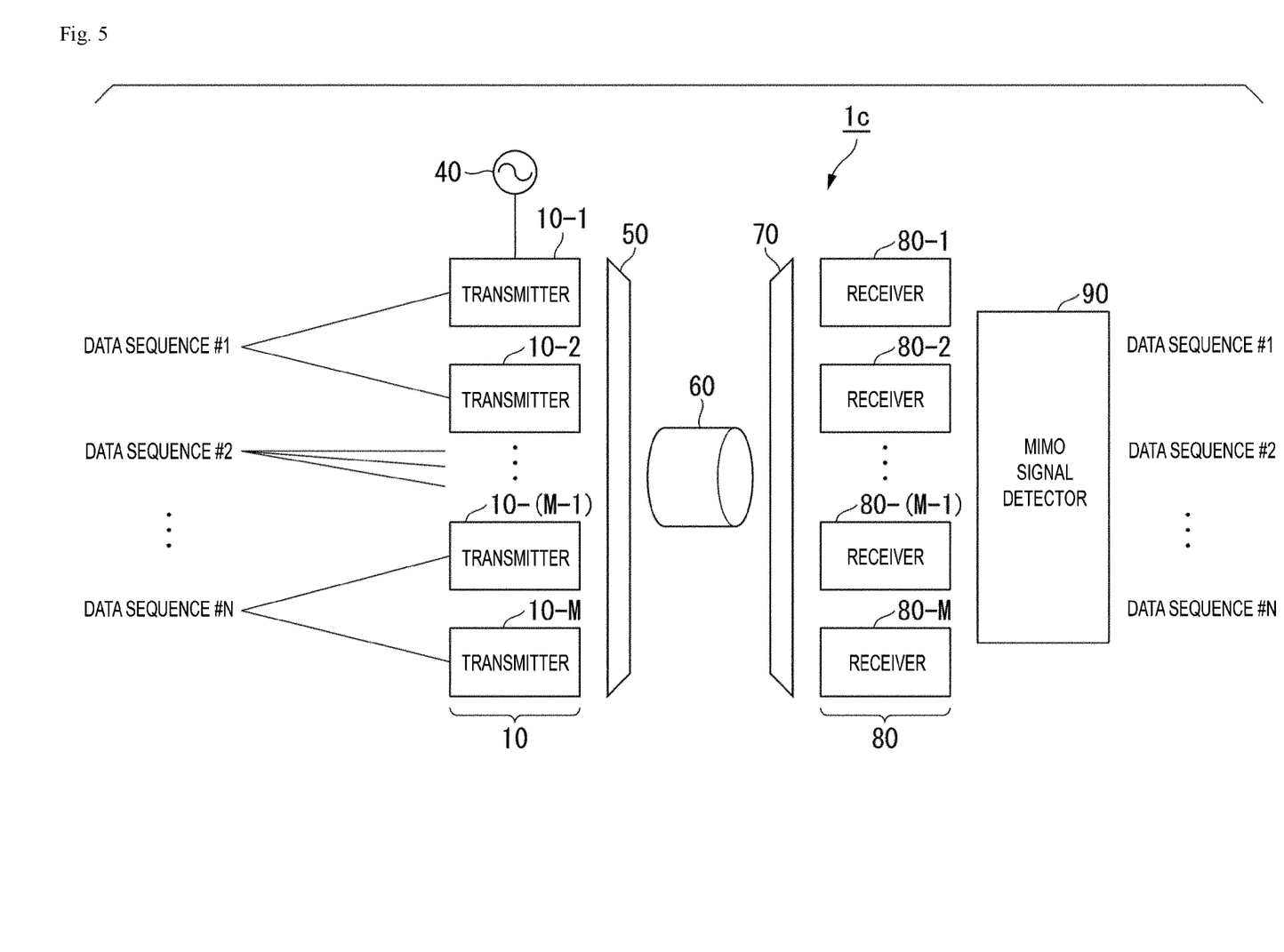
FIG. 5 is a configuration diagram of a multi-mode optical fiber system 1c according to a third embodiment of the present invention.

Hereinafter, a multi-mode optical fiber system 1c according to a third embodiment of the present invention will be described with reference to the drawings.

Configuration of Multi-Mode Optical Fiber System FIG. 5 is a configuration diagram of the multi-mode optical fiber system 1c according to the third embodiment of the present invention. As illustrated, the multi-mode optical fiber system 1c includes transmitters 10, a synchronization circuit 40, a mode multiplexer/demultiplexer 50, a mode-multiplexed fiber 60, a mode multiplexer/demultiplexer 70, receivers 80, and a MIMO signal detector 90.

The multi-mode optical fiber system 1c includes M (where M is an integer of 1 or more) transmitters 10 (transmitter 10-1 to transmitter 10-M). The multi-mode optical fiber system 1c also includes M receivers 80 (receiver 80-1 to receiver 80-M), the number of which is the same as that of the transmitters 10.

Furthermore, the multi-mode optical fiber system 1c includes N (where N is an integer of 1 or more) synchronization circuits 40. Note that, for ease of illustration, only one synchronization circuit 40 is illustrated in FIG. 5.

The multi-mode optical fiber system 1c acquires N data sequences (data sequence #1 to data sequence #N) output from, for example, an external device or the like. The multi-mode optical fiber system 1c is an optical transmission system for transmitting the N data sequences (data sequence #1 to data sequence #N) with no error from the transmitter 10 side to the receiver 80 side.

The multi-mode optical fiber system 1c replicates electrical signals indicating the acquired N data sequences so as to obtain electrical signals indicating a required number (M in this case) of data sequences. The multi-mode optical fiber system 1c inputs M data sequences (data sequence #1 to data sequence #M) that have been optionally replicated to the M transmitters 10 (transmitter 10-1 to transmitters 10-M), respectively.

Each of the M transmitters 10 acquires an electrical signal indicating any one of the M data sequences. Each of the M transmitters 10 appropriately encodes the acquired data sequence. Each of the M transmitters 10 converts the encoded data sequence from an electrical signal to an optical signal. Each of the M transmitters 10 outputs a data sequence that has been converted to an optical signal to the mode multiplexer/demultiplexer 50.

At this time, a plurality of transmitters 10 converting, into optical signals, identical electrical signals indicating identical data sequences (any of data sequence #1 to data sequence #N) due to the replication are synchronized with each other by the synchronization circuit 40. For example, in a case where the data sequence #1 is converted from an electrical signal to an optical signal using the transmitter 10-1 and the transmitter 10-2, the transmitter 10-1 and the transmitter 10-2 are synchronized by the synchronization circuit 40 and then perform the conversion.

The mode multiplexer/demultiplexer 50 (multiplexer) acquires the M optical signals output from the M transmitters 10. The mode multiplexer/demultiplexer 50 converts the acquired M optical signals into one mode-multiplexed signal by multiplexing the acquired M optical signals in different types of spatial modes. The mode multiplexer/demultiplexer 50 causes the mode-multiplexed signal to be incident on the mode-multiplexed fiber 60.

The mode-multiplexed fiber 60 serving as a transmission line is, for example, an optical fiber having a single core. The mode-multiplexed fiber 60 is an optical fiber in which at least M modes are excitable in a wavelength band to be used. The mode-multiplexed fiber 60 is, for example, a multi-mode fiber or a few-mode fiber.

The mode-multiplexed fiber 60 transmits the mode-multiplexed signal incident from the mode multiplexer/demultiplexer 50 and causes the mode-multiplexed signal to exit to the mode multiplexer/demultiplexer 70.

The mode multiplexer/demultiplexer 70 (demultiplexer) converts the acquired mode-multiplexed signal into M optical signals. The mode multiplexer/demultiplexer 70 outputs the M optical signals to the M receivers 80, respectively.

The receivers 80 each are a reception device compatible with the mode diversity structure. Each of the M receivers 80 converts the optical signal acquired from the mode multiplexer/demultiplexer 70 into an electrical signal. Each of the M receivers 80 outputs the electrical signal to the MIMO signal detector 90. As a result, each of the M electrical signals is output to the MIMO signal detector 90.

The MIMO signal detector 90 acquires the electrical signals output from the M receivers 80. The MIMO signal detector 90 removes distortion and the like contained in the acquired M electrical signals. As a result, the MIMO signal detector 90 can separate the M electrical signals by digital signal processing to extract the original N data sequences (data sequence #1 to data sequence #N). The MIMO signal detector 90 outputs the extracted N data sequences to, for example, an external device or the like.

Figure 6:
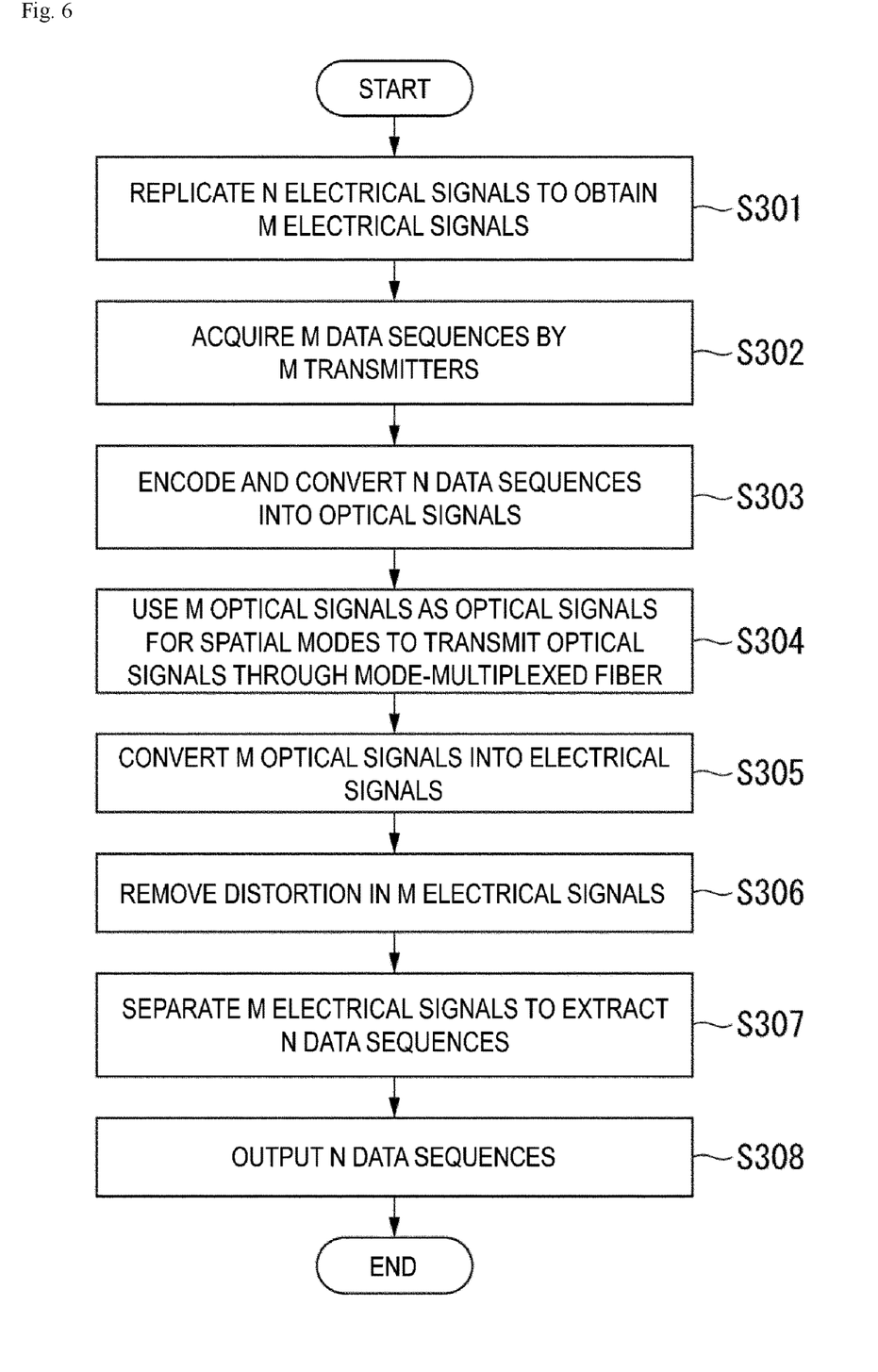
FIG. 6 is a flowchart illustrating an operation of the multi-mode optical fiber system 1c according to the third embodiment of the present invention.

Operation of Multi-Mode Optical Fiber System In the following, an example of an operation of the multi-mode optical fiber system 1c will be described.

FIG. 6 is a flowchart illustrating the operation of the multi-mode optical fiber system 1c according to the third embodiment of the present invention.

The multi-mode optical fiber system 1c replicates electrical signals indicating N data sequences (data sequence #1 to data sequence #N) output from, for example, an external device or the like so as to obtain a required number (M in this case) of electrical signals (step S301). The multi-mode optical fiber system 1c acquires M data sequences by the M transmitters 10 (transmitter 10-1 to transmitters 10-M), respectively (step S302).

Each of the M transmitters 10 (transmitter 10-1 to transmitter 10-M) encodes a corresponding one of the M data sequences and converts the data sequence from an electrical signal to an optical signal (step S303). The M transmitters 10 (transmitter 10-1 to transmitter 10-M) output M optical signals to the mode multiplexer/demultiplexer 50, respectively.

Note that the operation of the multi-mode optical fiber system 1c in and after step S304 is similar to the operation of the multi-mode optical fiber system 1a illustrated in and after step S104 of FIG. 2 described above, and thus description thereof is omitted.

In this way, the multi-mode optical fiber system 1c according to the third embodiment of the present invention performs transmission diversity in an electrical region. This allows the multi-mode optical fiber system 1c to reduce the required number of optical devices and optical amplifiers, for example. Furthermore, the multi-mode optical fiber system 1c can avoid a power loss of an optical signal and thus generate a diversity signal with a good SNR. From the foregoing, the multi-mode optical fiber system 1c according to the third embodiment of the present invention can reduce information errors of optical signals transmitted through a transmission line by mode multiplexing.

At least a part of the multi-mode optical fiber system in the embodiments described above may be implemented with a computer. In that case, the functions may be implemented by recording a program for implementing the functions in a computer readable recording medium and causing a computer system to read and execute the program recorded in the recording medium. Note that the "computer system" described here is assumed to include an OS and hardware such as a peripheral device. The "computer-readable recording medium" means a portable medium such as a flexible disk, a magneto-optical disk, a ROM, or a CD-ROM or a storage device such as a hard disk incorporated in the computer system. Moreover, the "computer-readable recording medium" may include a recording medium that dynamically holds the program for a short period of time, such as a communication line in a case in which the program is transmitted via a network such as the Internet or a communication line such as a telephone line, or a recording medium that holds the program for a specific period of time, such as a volatile memory inside a computer system that serves as a server or a client in that case. Furthermore, the aforementioned program may be for implementing some of the aforementioned functions, or may be able to implement the aforementioned functions in combination with a program that has already been recorded in the computer system, or using a programmable logic device such as a field programmable gate array (FPGA).

REFERENCE SIGNS LIST 1a, 1b, 1c Multi-mode optical fiber system
10 Transmitter
20 Diversity signal generator
21 Optical splitter
30 Optical switch
40 Synchronization circuit
50 Mode multiplexer/demultiplexer
60 Mode-multiplexed fiber
70 Mode multiplexer/demultiplexer
80 Receiver
90 MIMO signal detector

The invention claimed is:

1. An optical transmission system comprising:
N transmitters configured to convert N electrical signals indicating N data sequences different from one another into N optical signals, respectively, N being an integer of 1 or more;
a signal generator configured to convert the N optical signals into first M optical signals by splitting the N optical signals via N optical splitters, M being an integer of 2 or more, M being larger than N;
a multiplexer configured to convert the first M optical signals into one mode-multiplexed signal that is excitable in at least M modes;
a demultiplexer configured to receive the one mode-multiplexed signal via a mode-multiplexed fiber and convert the one mode-multiplexed signal into second M optical signals;
M receivers configured to convert the second M optical signals into M electrical signals, respectively; and
a signal detector configured to extract the N data sequences by performing signal separation on the M electrical signals.

2. The optical transmission system according to claim 1, wherein each of the N optical splitters splits one of the N optical signals into one or a plurality of optical signals with a uniform power.

3. The optical transmission system according to claim 1, wherein the signal generator is a diversity signal generator, and
the diversity signal generator includes an optical amplifier and an optical attenuator.

4. The optical transmission system according to claim 1, wherein the mode-multiplexed fiber is a few-mode fiber for 2 LP modes, and
the few-mode fiber for 2 LP modes has six spatial modes as the M modes.

5. The optical transmission system according to claim 1, wherein the signal detector is a MIMO signal detector.

6. An optical transmission system comprising:
N transmitters configured to convert N electrical signals indicating N data sequences different from one another into N optical signals, respectively, N being an integer of 1 or more;
an optical switch configured to branch the N optical signals into first M optical signals, M being an integer of 2 or more, M being larger than N;
a multiplexer configured to convert the first M optical signals into one mode-multiplexed signal that is excitable in at least M modes;

a demultiplexer configured to receive the one mode-multiplexed signal via a mode-multiplexed fiber and convert the one mode-multiplexed signal into second M optical signals;

M receivers configured to convert the second M optical signals into M electrical signals, respectively; and a signal detector configured to extract the N data sequences by performing signal separation on the M electrical signals.

7. The optical transmission system according to claim 6, wherein the optical switch is a route and select switch, and the route and select switch is configured with a 1×N wavelength selection switch at an input side, an M×1 wavelength selection switch at an output side, an optical amplifier, and an optical attenuator.

8. The optical transmission system according to claim 6, wherein the mode-multiplexed fiber is a few-mode fiber for 2 LP modes, and the few-mode fiber for 2 LP modes has six spatial modes as the M modes.

9. The optical transmission system according to claim 6, wherein the signal detector is a MIMO signal detector.

10. An optical transmission system comprising:

M transmitters configured to convert M electrical signals into first M optical signals, the M electrical signal being generated by replicating N electrical signals indicating N data sequences different from one another, N being an integer of 1 or more, M being an integer of 2 or more, M being larger than N;

a multiplexer configured to convert the first M optical signals into one mode-multiplexed signal that is excitable in at least M modes;

a demultiplexer configured to receive the one mode-multiplexed signal via a mode-multiplexed fiber and convert the one mode-multiplexed signal into second M optical signals;

M receivers configured to convert the second M optical signals into M electrical signals, respectively; and a signal detector configured to extract the N data sequences by performing signal separation on the M electrical signals.

11. The optical transmission system according to claim 10, further comprising:

a synchronization circuit configured to synchronize two of the M transmitters that respectively convert two identical electrical signals of the M electrical signals into two identical optical signals of the first M optical signals, the two identical electrical signals respectively corresponding to one data sequence of the N data sequences.

12. The optical transmission system according to claim 11, wherein the synchronization circuit is configured with N synchronization circuits.

13. The optical transmission system according to claim 10, wherein the mode-multiplexed fiber is a few-mode fiber for 2 LP modes, and the few-mode fiber for 2 LP modes has six spatial modes as the M modes.

14. The optical transmission system according to claim 10, wherein the signal detector is a MIMO signal detector.

* * * * *